Feb. 28, 1956 R. D. LOHMAN ET AL 2,736,765

AUTOMATIC SWITCHING

Filed July 27, 1953

INVENTORS
ROBERT D. LOHMAN
& GERALD B. HERZOG

BY [signature]

ATTORNEY

1

2,736,765

AUTOMATIC SWITCHING

Robert D. Lohman, Princeton Junction, and Gerald B. Herzog, Princeton, N. J., assignors to Radio Corporation of America, a corporation of Delaware Application July 27, 1953, Serial No. 370,344

7 Claims. (Cl. 178—5.4)

The present invention relates to automatic switching circuits, and more particularly, but not necessarily exclusively, to means for automatically disabling, or enabling the operation of, the color control circuits of television receiving apparatus in response to the presence or absence of color information in the incoming television signals.

In the subcarrier type of color televison system which is in accordance with the signal specifications presently proposed by the National Television System Committee (NTSC), the sidebands of a subcarrier wave which are both phase and amplitude modulated in accordance with the color information of a televised subject, are interspersed with the video carrier sidebands representative of the brightness of the subject. In such systems the color information is derived in a receiver by synchronously demodulating the modulated color subcarrier wave. Such demodulation is effected under the control of sampling waves from a reference frequency oscillator operating in synchronism, and in predetermined phase relationship, with the color subcarrier wave.

For the synchronization of the reference frequency oscillator at the receiver, it is the present practice to transmit a composite signal which includes, in addition to the video signals representative of brightness and color information and the usual horizontal and vertical synchronizing signals, bursts of several cycles each of the color subcarrier wave frequency respectively located on the blanking pedestal "back porch" following the horizontal synchronizing pulses. Such a color synchronizing system is described in a publication entitled "Recent Developments in Color Synchronization in the RCA Color Television System" issued by the Radio Corporation of America, February 1950. Such a system is also described in U. S. Patent 2,594,380 issued April 29, 1952, to L. Barton and P. Werenfels and entitled "Synchronizing Apparatus for Color Signal Sampling Oscillators." The burst type color synchronization is also the general subject of the co-pending U. S. application of Alda V. Bedford Serial No. 143,800, filed February 11, 1950, and entitled "Synchronizing Apparatus," now U. S. Patent No. 2,728,812, issued December 27, 1955.

In order that a color televison receiver may properly reproduce high quality black and white pictures when receiving monochrome televison signals, it is desirable that the color demodulating apparatus in the receiver be disabled when monochrome signals are being received. Since presence or absence of the color synchronizing bursts in the received composite signal is indicative of the respective color or monochrome nature of the received signal, it logically follows that apparatus responsive to the presence or absence of the burst may be employed to respectively control the enabling or disabling of operation of the color demodulators.

In accordance with the present invention a switching circuit, responsive to the presence or absence of the color synchronization burst and employing a semiconductor device as the switching element, is utilized to provide the desired disabling-enabling action. In accordance with several embodiments of the invention accurate switching action between an operating and a cutoff bias is provided with a disabling, or "color killer," circuit employing a single junction transistor and requiring a relatively low level of burst input.

It is therefore the primary object of the present invention to provide a new and improved disabling-enabling color control circuit.

It is a further object of the present invention to provide a novel junction transistor circuit for switching between operating and cutoff bias conditions for a signal translating device associated with the color demodulation apparatus of a television receiver in response to the presence or absence of a color synchronizing signal.

It is an additional object of the present invention to provide a novel transistor "color killer" circuit.

Other objects and advantages of the present invention will become readily apparent to those skilled in the art upon a reading of the following detailed description and an inspection of the accompanying drawing in which.

Figures 1, 2:
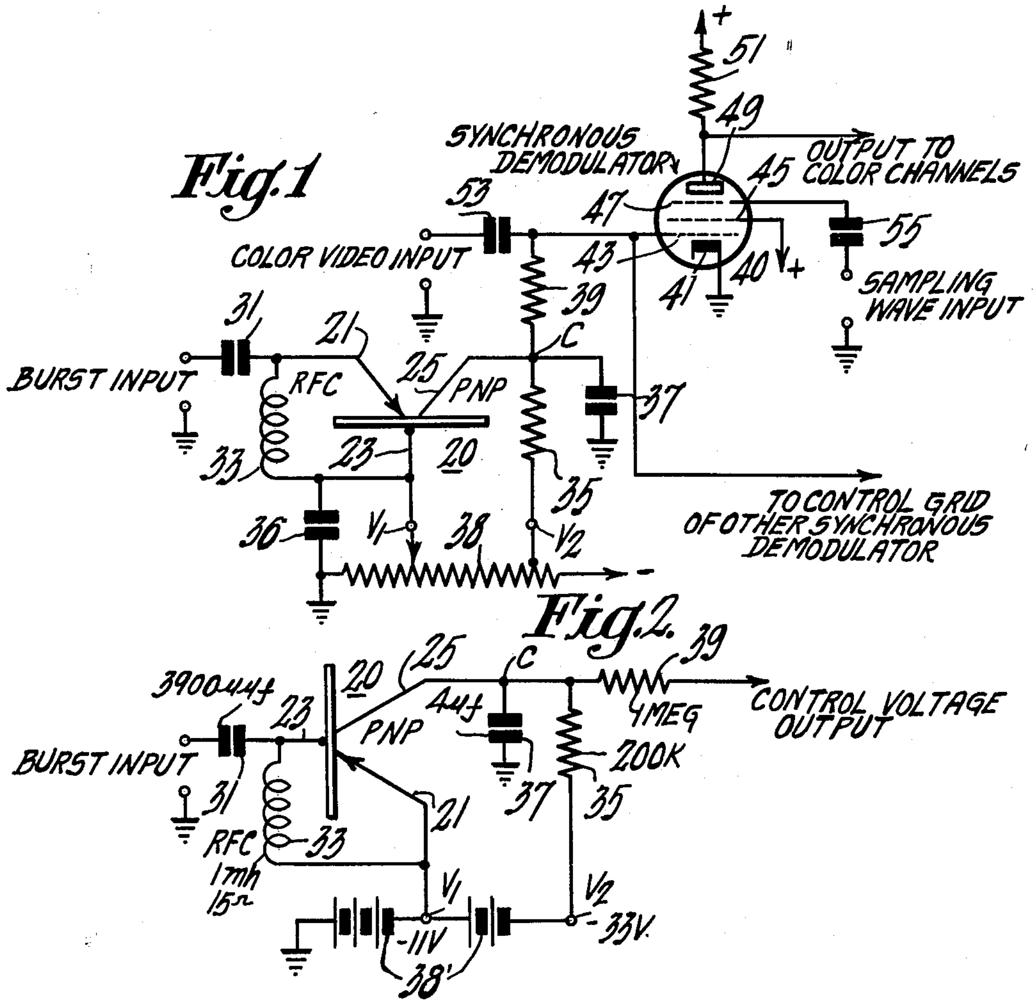
Fig. 1 illustrates schematically a color killer circuit in accordance with an embodiment of the present invention.
Fig. 2 illustrates schematically, in accordance with another embodiment of the present invention, a modification of the switching apparatus illustrated in Fig. 1.

Referring to Fig. 1 in greater detail, a semiconductor device 20 of the junction transistor type is illustrated therein. In the embodiment to be presently described, the transistor 20 is of the P-N-P type. However, as exemplified by an embodiment of the invention illustrated in Fig. 3, to be subsequently described, junction transistors of the N-P-N type may also be readily utilized in practicing the principles of the invention. The transistor 20, which comprises a body of semiconductive material having a zone of N-type material interposed between two outer zones of P-type material, is conventionally provided with an emitter electrode 21 and a collector electrode 25, respectively in ohmic contact with the outer P-type zones, and a base electrode 23 in ohmic contact with the intermediate N-type zone.

The base electrode 23 is connected to a point of negative potential ($-V_1$) relative to ground or reference potential, while the collector electrode 25 is connected through a resistor 35 to a point of more negative potential ($-V_2$). The negative potentials $-V_1$ and $-V_2$, may be conventionally derived from any suitable source, such as via the well-regulated bleeder resistor 38. The base 23 is by-passed to ground through the capacitor 36. The emitter electrode 21 is connected by way of a low D. C. impedance, such as a radio frequency choke 33, to the base electrode 23. With the base and emitter electrodes, 23 and 21, at the same D. C. potential the transistor is normally cut off. Capacitor 37 is connected between the collector 25 and ground. In the absence of conduction of the transistor 20, the capacitor 37 charges up to the negative potential $-V_2$ and remains substantially at that potential.

However, the emitter electrode 21 is adapted to receive, from the terminals labeled "burst input" via capacitor 31, the color synchronizing bursts of subcarrier frequency whenever they are present in the received composite signal. It may thus be assumed that the burst input terminals are coupled to appropriate points in a burst separating apparatus which serves to remove the color synchronization burst from the received composite signal. Such apparatus is shown, for example, in the aforesaid patent to Barton and Werenfels.

Whenever a burst of several cycles of the subcarrier frequency appears at the burst input terminals the positive half-cycles of the subcarrier frequency wave cause current flow into the emitter electrode 21. The resultant flow of current out of the collector electrode 25 discharges the capacitor 37 down to a less negative potential, the junction point "C" between the collector 25 and capacitor 37 being effectively shorted to the point $-V_1$ through the conducting base-collector path of the transistor. The RC time constant for the resistor 35-capacitor 37 combination is chosen to be long relative to the conventional line interval duration. Thus, at the termination of the burst, when transistor 20 returns to a nonconductive condition, the capacitor 37 remains charged at essentially the $-V_1$ potential throughout the line interval preceding the arrival of the next color synchronization burst.

Thus, so long as the subcarrier frequency bursts regularly appear in the received composite signal, the point "C" remains essentially at the $-V_1$ potential. However, should monochrome signal reception commence and the color synchronizing bursts therefore cease to arrive, the capacitor 37 will again charge up to the more negative potential $-V_2$, and point "C" will thereafter remain essentially at this potential, no discharge path being available through the transistor 20.

It may thus be seen that the described transistor circuit effectively provides a means for switching the point "C" between two voltage conditions, a negative potential, $-V_1$, when color synchronizing bursts regularly appear at the burst input terminals, and a more negative potential, $-V_2$, in the absence of such regular appearances of bursts. It will be readily appreciated that the control voltage output at point "C" may be applied at various points in conventional television receiving apparatus to control the disabling or enabling of the color demodulation operations. In Fig. 1 the color killer output voltage at the point "C" has been used to control the biasing of the synchronous demodulators in a color television receiver. This use is illustrative only, and it will be appreciated that alternatively the color killer may operate, for example, on a bandpass amplifier through which the multiplex video signals are applied to the demodulators.

In Fig. 1 a synchronous demodulator has been illustrated as comprising a pentode 40. The cathode 41 is grounded and the anode 49 is connected through an anode resistor 51 to an indicated source of positive operating potential (not illustrated). The screen grid 45 is also connected to a suitable point of positive potential. The third or suppressor grid 47 is supplied with sampling waves of reference frequency from the terminals labeled "sampling wave input" via a capacitor 55. As previously discussed the receiver in a subcarrier type color television system includes a reference frequency oscillator which is synchronized in frequency and is maintained in a predetermined phase relationship with the subcarrier frequency wave. Thus the sampling wave input terminals may be assumed to be appropriately coupled to the output circuit of the synchronized reference frequency oscillator or to a subsequent reference frequency amplifying stage.

The received video signals are applied to the control grid 43 from the terminals labeled "color video input" via a capacitor 53. In the subcarrier type color television system, the sidebands of the color subcarrier generally occupy a limited portion of the frequency band occupied by the brightness signals. Therefore, the receiving apparatus generally includes bandpass circuits, having a passband corresponding to such limits, through which the color information is fed to the demodulators. Hence, it may be assumed that the color video input terminals are coupled to a bandpass circuit associated with the output of the receiver's video amplifier, and having the appropriate passband for the color subcarrier and its sidebands.

The control grid 43 is connected through resistor 39 to the point "C," the junction of collector 25 and capacitor 37. The voltages $-V_1$ and $-V_2$ are chosen such that $-V_1$ is an appropriate operating bias for the demodulator tube 40, while $-V_2$ is an effective cutoff bias for the tube 40. Thus, in the absence of the regulator appearance of color synchronizing bursts at the burst input terminals, the control grid 43 is held at a cutoff bias and the demodulator tube 40 is therefore not functioning. However, when color synchronization bursts regularly appear at burst input terminals, the control grid 43 receives an operating bias, and the tube 40 may thus perform its function of synchronously demodulating the color subcarrier, the demodulated color information being derived from the plate 49 and supplied to appropriate utilization circuits.

Although only one demodulator has been illustrated schematically in Fig. 1 it will be appreciated that a receiver in a subcarrier type color television system conventionally requires at least two demodulators to recover the color information from the modulated subcarrier wave. Therefore a connection from the control grid 43 to the control grid of the additional synchronous demodulator has been indicated on the drawings. The additional demodulator may be similar to that shown, but receiving a reference frequency wave of an appropriately different phase. The action of the color killer circuit on the additional demodulator is similar to the action described in connection with tube 40; that is, supplying the demodulator with an operating bias when bursts are regularly received, and supplying the demodulator with a cutoff bias when bursts are absent from the received composite signal. Where the receiver employs three synchronous demodulators, as in some known forms of the so-called symmetrical sampling system, the control voltage output appearing at point "C" may similarly be used to control the cutoff or operation of three demodulator tubes.

In Fig. 2 a modification of the transistor circuit of Fig. 1 is illustrated in which a base input arrangement is employed. Thus, the color synchronization bursts are applied from the burst input terminals via the capacitor 31 to the base electrode 23 of the transistor 20. The emitter electrode 21 is connected to a point of negative potential, $-V_1$ relative to ground, and the emitter 21 and base 23 are again coupled together by way of a radio frequency choke 33. The collector 25 is again connected through a resistor 35 to a point of more negative potential ($-V_2$). The voltages $-V_1$ and $-V_2$, may be derived from a suitable well regulated source, such as batteries 38'. The capacitor 37 is coupled between the collector 25 and ground. Operation of the modification of Fig. 2 is quite similar to that of Fig. 1. In the absence of a burst input the capacitor 37 is normally charged to the more negative potential $-V_2$. However, when a burst appears at the burst input terminals, the negative half-cycles of the subcarrier frequency wave cause current flow out of the base electrode 23, which renders the emitter-collector path of the transistor conducting. The capacitor 37 is then rapidly discharged through the low impedance transistor path to the less negative potential $-V_1$. Due to the relatively long time constant of the resistor 35-capacitor 37 combination, the potential at point "C" remains essentially at the $-V_1$ level during the line intervals between successive bursts. An advantage of the base input arrangement of Fig. 2 over the emitter input arrangement of Fig. 1 is the greater current gain obtainable with the former.

Figure 3:
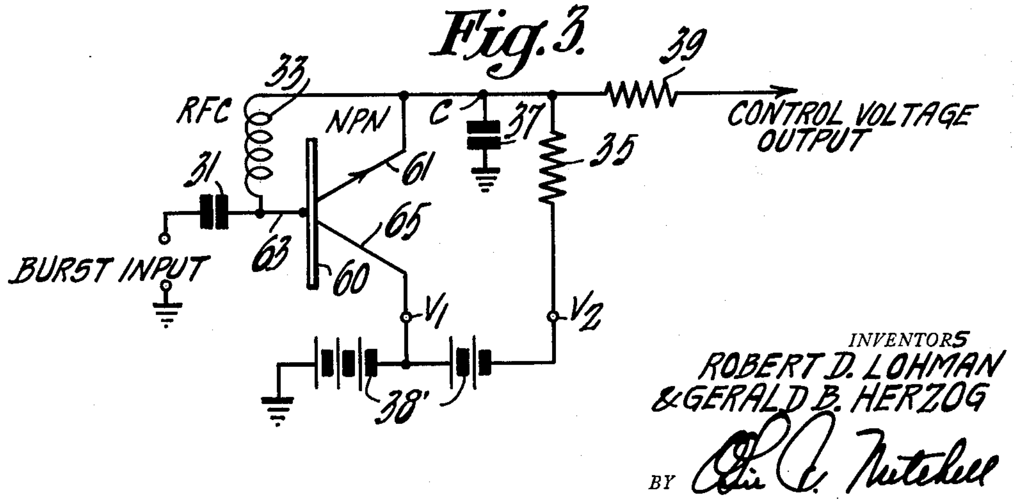
Fig. 3 illustrates schematically, in accordance with a further embodiment of the invention, another modification of the switching apparatus.

Fig. 3 illustrates the utilization of a junction transistor of the N-P-N type to practice the principles of the present invention. A base input arrangement, somewhat similar to that of Fig. 2, is shown but it may be noted that in accordance with the reverse polarity conditions associated with the N-P-N transistor as contrasted with the P-N-P transistor, the color killer circuit of Fig. 3 has been shown as a "grounded collector" stage whereas the color killer circuit of Fig. 2 presented a "grounded emitter" stage. The method of operation in Fig. 3 need not be described in detail for it will essentially correspond to the principles of operation of the embodiments illustrated in Figs. 1 and 2 and may readily be derived from a consideration thereof.

It may be noted that values of circuit constants for a practical version of the base input embodiment of Fig. 2 have been indicated on the drawing. These values are given by way of example only, and the invention should not be considered as limited thereto. In a working example of the invention using the values indicated in Fig. 2, a commercial transistor of the RCA 2N34 type was employed, and the burst input terminals were coupled across a 68 ohm cathode resistor in the burst amplifier of an experimental color television receiver. The circuit readily effected accurate switching between an 11 volt operating bias and a 33 volt cutoff bias for a band-pass amplifier through which video signals are applied to the demodulators of the receiver.

It may be noted that the use of a low D. C. impedance connection, such as the radio frequency choke 33, between the base and emitter electrodes of the transistor in the several embodiments illustrated, serves two significant functions. First, if a low impedance path between the base and emitter electrodes is not provided, a self-biasing type of action would occur in the input circuit, developing a charge on the input capacitor tending to apply a reverse bias to the input electrode and reducing the conduction realized in response to burst of a given amplitude. Secondly, with relation to the base input arrangements of Fig. 2, a low base impedance is desired to prevent the leakage current between base and collector electrodes (i. e. the so-called $i_{co}$) from developing a forward bias across the base impedance which would tend to keep the transistor conducting irrespective of the presence or absence of the bursts. It will, of course, be appreciated that while a radio frequency choke has been illustrated as the low D. C. impedance, a small resistor, for example, may be substituted therefor.

While significant embodiments of the present invention employing transistors of the junction type have been illustrated and explained in the foregoing discussions, circuit arrangements similar to those shown in the accompanying drawings but employing transistors of the so-called point-contact type in place of the junction transistors are believed by the applicants to be also within the scope of the present invention. However, where the available point-contact transistors tend toward instability in a base input type of arrangement, the emitter input circuit arrangement, as exemplified in Fig. 1, will be the more desirable one in point-contact transistor utilization.

Having described our invention, what is claimed is:

1. In a color television receiver adapted to receive composite color television signals which include a color subcarrier wave modulated in accordance with color information, and periodically repeating color synchronization bursts of several cycles of subcarrier frequency, as well as black and white television signals which do not include said bursts, and wherein there are provided means for separating said bursts from said composite signal, and apparatus for demodulating said modulated color subcarrier, the combination comprising a charge storage device, a charging circuit for charging said storage device to a cutoff potential, said charging circuit having a time constant which is relatively long compared to the period of repetition of said bursts, a discharging circuit operable for altering the charge of said storage device to an operating potential, a semiconductor device, said discharging circuit including a current path in said semiconductor device, means for rendering said current path normally nonconducting, means responsive to said bursts for rendering said current path conducting and thereby operating said discharging circuit, and means coupled to said charge storage device for disabling said demodulating apparatus when the charge on said storage device substantially corresponds to said cutoff potential and for enabling the operation of said demodulating apparatus when the charge on said storage device substantially corresponds to said operating potential.

2. In a television system wherein received color television signals may be differentiated from received black and white television signals by the presence of color synchronization bursts in the former and the absence of said bursts in the latter, and wherein the receiving apparatus includes means for deriving color information from said color television signals, the combination comprising a semiconductor device having a plurality of electrodes, means for coupling a first one of said electrodes to a source of negative potential, means for coupling a second electrode to a source of less negative potential, the current path in said semiconductor device between said first and second electrodes being normally nonconducting, means for applying said bursts to a third electrode of said semiconductor device, said current path being rendered conducting in response to the application of said bursts to said third electrode, a charge storage device coupled between said first electrode and a point of reference potential, and means for coupling said first electrode to said color information deriving means.

3. A combination in accordance with claim 2 wherein said charge storage device is also provided with a charging circuit which includes said first source of negative potential and which has a time constant that is relatively long compared to the period of repetition of said bursts.

4. In a color television receiver adapted to receive composite color television signals which include a color subcarrier wave modulated in accordance with color information, and periodically repeating color synchronization bursts of several cycles of subcarrier frequency, as well as black and white television signals which do not include said bursts, and wherein there are provided means for separating said bursts from said composite signal, and apparatus for demodulating said modulated color subcarrier, the combination comprising a transistor having an input electrode, an output electrode and a common electrode, a capacitor coupled between said output electrode and a point of reference potential, means including a resistor for coupling said output electrode to a source of negative potential relative to said reference, the combination of said resistor and said capacitor having a time constant which is relatively long compared to the period of repetition of said bursts, means for coupling said common electrode to a second source of less negative potential relative to said reference, means for applying said bursts to said input electrode, and means responsive to the potential of said output electrode for controlling the operation of said demodulating apparatus.

5. A combination in accordance with claim 4 wherein there is provided a low D. C. impedance connection between said input electrode and said common electrode.

6. In a color television receiver operating at standard line and field rates and adapted to receive monochrome and color television signals, the combination comprising a capacitor, means for charging said capacitor to a given potential, a semiconductor device having a normally nonconducting current path, means for rendering said current path periodically conducting in response to the presence of color information in the received television signal, said current path providing a low impedance discharge path for said capacitor when rendered conducting, the time constant for said capacitor charging means being relatively long and the time constant for said discharge path being relatively short compared to the standard line period, and utilization means responsive to the charge on said capacitor.

7. A combination in accordance with claim 6 wherein said utilization means includes color subcarrier demodulating means deriving a bias voltage from said capacitor.

References Cited in the file of this patent

UNITED STATES PATENTS

| | | |
|---|---|---|
| 2,622,213 | Harris | Dec. 16, 1952 |
| 2,635,140 | Dome | Apr. 14, 1953 |
| 2,641,717 | Toth | June 9, 1953 |
| 2,697,744 | Richman | Dec. 21, 1954 |